Sept. 19, 1933.　　　W. L. LINDGREN　　　1,927,461
DISHWASHING MACHINE
Filed Oct. 15, 1931　　　3 Sheets-Sheet 1

Inventor:
Waldemar L. Lindgren
By John Howard McElroy
his Attorney.

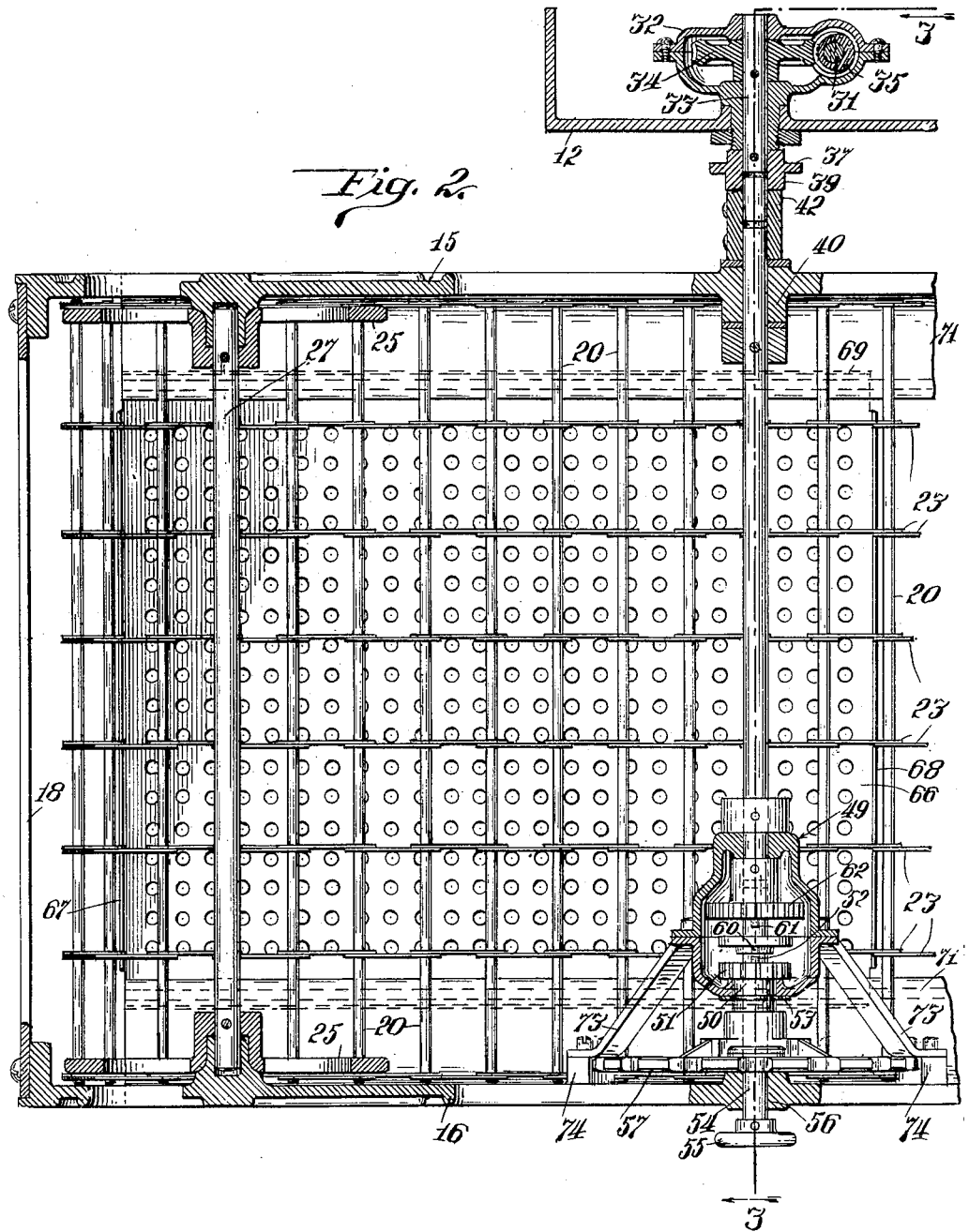

Sept. 19, 1933.  W. L. LINDGREN  1,927,461
DISHWASHING MACHINE
Filed Oct. 15, 1931   3 Sheets-Sheet 3
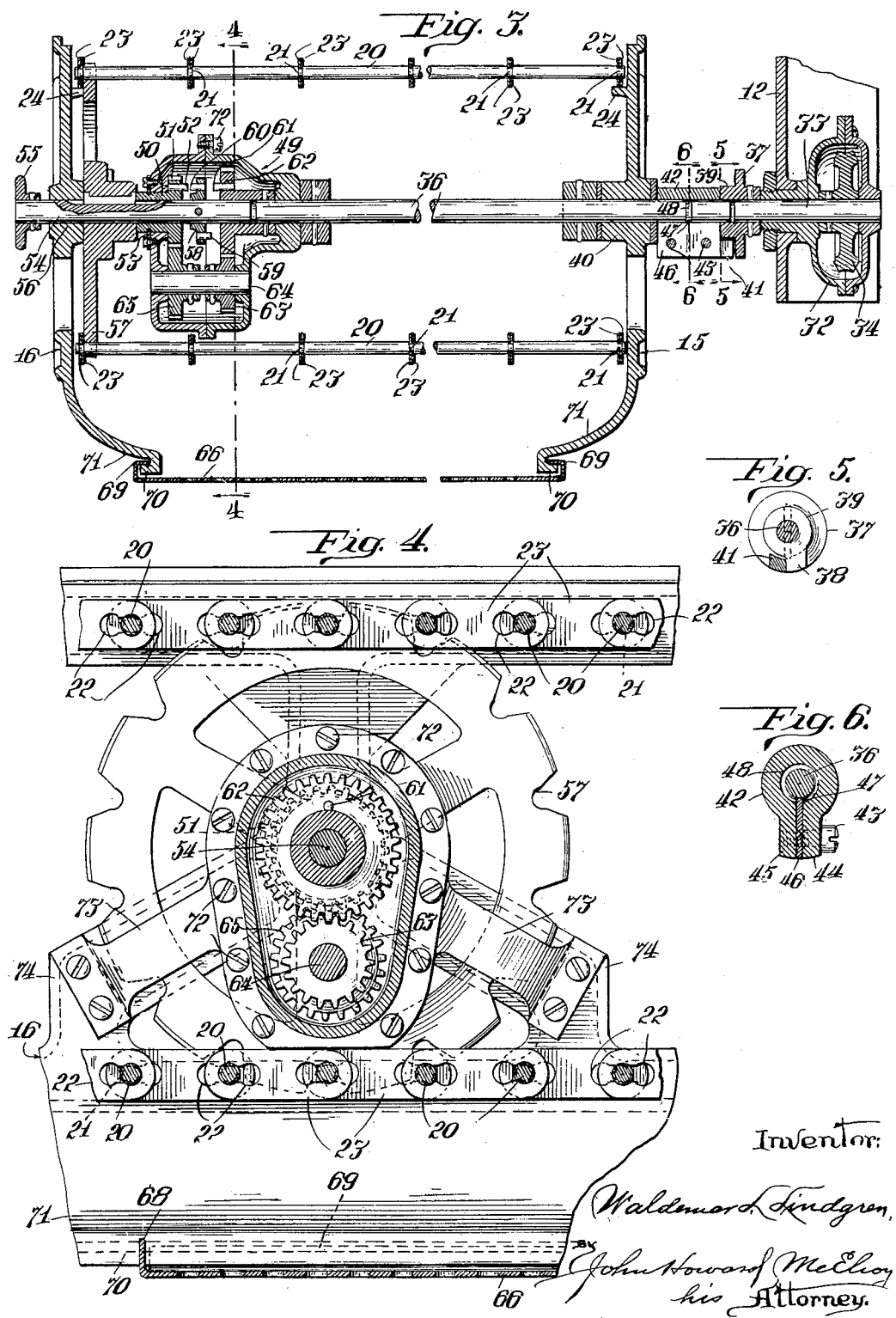

Patented Sept. 19, 1933

1,927,461

UNITED STATES PATENT OFFICE 1,927,461

DISHWASHING MACHINE

Waldemar L. Lindgren, Waukegan, Ill., assignor of one-half to John E. Ericsson, Chicago, Ill.

Application October 15, 1931. Serial No. 568,970

2 Claims. (Cl. 198—110)

My invention is concerned with a conveyor designed primarily for use in dish washing machines of the general type shown in my Patent No. 1,798,428, dated March 31, 1931, and as disclosed in an improved form in my application No. 509,658, filed January 19, 1931, and is designed to produce a conveyor for such machines by which the dishes, etc., can be carried past the spraying mechanism at a faster or slower speed, without changing the speed of the motor, depending upon whether the dishes are soiled slightly or badly, so as to necessitate little or much washing.

To illustrate my invention, I annex hereto three sheets of drawings, in which the same reference characters are used to designate identical parts in all the figures, of which,—

Fig. 2 is a horizontal section, on an enlarged scale, on the line 2—2 of Fig. 1.

Fig. 3 is a vertical section on the line 3—3 of Fig. 2.

Figure 1:
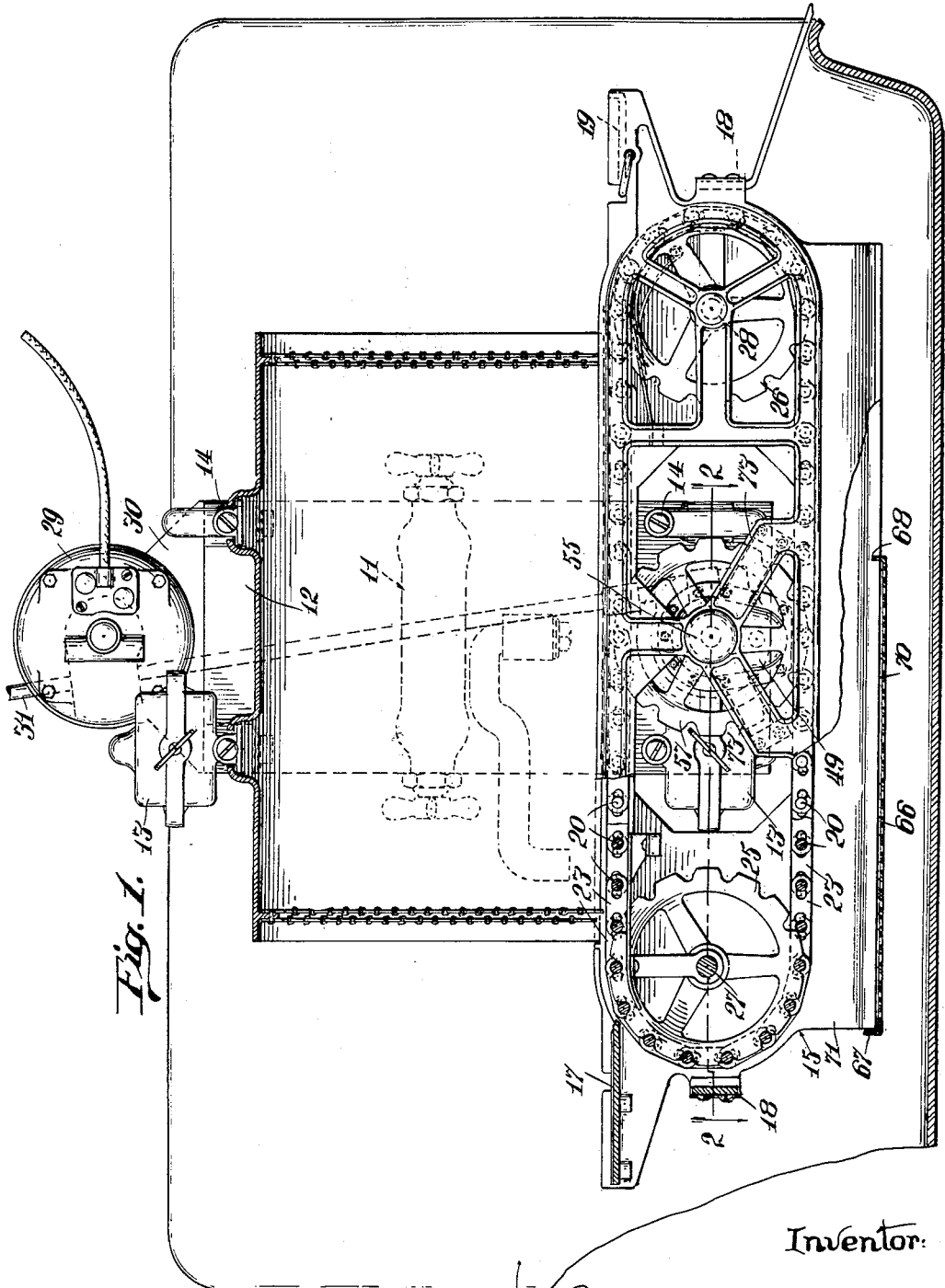
Fig. 1 is a front elevation, partly in section, of a dish-washing machine embodying my improvements.

Fig. 4 is a vertical section on the line 4—4 of Fig. 3, on an enlarged scale; and Figs. 5 and 6 are vertical sections on the lines 5—5 and 6—6, respectively, of Fig. 3.

My invention is concerned with dish-washing machines of the type adapted to be placed in a sink, and in which the conveying mechanism is preferably removable therefrom when it is not in use, and I have shown the same as applied to a customary kitchen sink 10, which is provided with the hot and cold water mixer 11, outlined in dotted lines in Fig. 1, and from which the water, after having been mixed, is carried by conduits, which are preferably formed in a casting 12, as seen in the aforesaid application No. 509,658, to the pairs of soapy-water sprayers 13 and the clear-water rinsing sprayers 14, the sprayers being preferably pivotally mounted in the casting 12 so that they can be turned at right angles to their operative position shown in Fig. 1, so as to be out of the way when the sink is ordinarily used.

The conveying mechanism, which is preferably supported in the sink, and removable therefrom, in the manner shown in the aforesaid patent and application, consists of two side frame members 15 and 16 at the rear and front of the sink, respectively, which members are connected by the transverse elements 17, 18 and 19, as clearly shown in the aforesaid patent and application. The skeleton conveyor is preferably formed of the plurality of transverse rods 20, which have formed therein at intervals the annular grooves 21 which receive the reduced portions of the apertures 22 formed in the links 23, the links and rods together cooperating to form a flexible, endless skeleton-conveyor, which is supported on its upper run by the ribs 24 projecting inwardly from the upper edge of the side frame members 15 and 16, and which is carried by the two pairs of sprocket wheels 25 and 26 secured on the ends of the transverse shafts 27 and 28 journaled in suitable bearings formed in the side frames 15 and 16. The mechanism thus far described does not differ in any substantial details from that shown in the aforesaid application No. 509,658.

The conveyor is driven primarily by the electric motor 29 which is supported from the bracket 30 carried by the casting 12, which in turn is suitably supported from the sink 10. The motor 29 is provided with the customary worm on its armature shaft meshing with a worm gear secured on the substantially vertical shaft 31, seen in dotted lines in Fig. 1, and which extends downwardly through the gear casing 32, seen in section in Figs. 2 and 3, in which is journaled the short shaft 33 having secured thereon the worm gear wheel 34, with which meshes the worm 35 secured on the aforesaid shaft 31.

Where the conveyor is removable from the sink, it is necessary to provide clutch connections between the shaft 33 and the transverse shaft 36 which drives the conveyor, and the connections are preferably associated with what may be termed a slip clutch, which operates to release the conveyor from the motor in case the conveyor becomes clogged or stopped in any way, to prevent breakage. For this purpose, I provide the connections best shown in Figs. 2 to 6, inclusive, where the shaft 33 has pinned on the outer end thereof the disk-like clutch member 37, which has the clutch tooth 38 projecting outwardly from the face of the disk 37 and occupying the same vertical plane as the hub-like extension 39 thereof which is employed to furnish a bearing for the adjacent end of the shaft 36, which also has the bearing 40 in the side frame 15. The clutch tooth 41 co-operating with the tooth 38 is formed on the adjacent end of the split-sleeve member 42, which has the two set screws 43 passing through the apertures in the portion 44 and threaded into apertures in the portion 45. In the split between these portions 44 and 45, I place the metal strip 46, which is initially of the proper thickness so that when the screws 43 are tightened up to clamp it securely between the parts 44 and 45, the slip-clutch member 42 will be secured on the shaft 36 with sufficient friction so that the shaft 36 will be rotated against any ordinary resistance offered by the conveying mechanism, but which will give way and slip in case abnormal resistance is met with. To prevent possible longitudinal movement of the slip clutch on the shaft 36, in case the slip occurs, I provide the tongue 47 on the strip 46, which tongue enters the annular groove 48 formed in the shaft 36 to receive it. In case the slip clutch becomes too loose as the result of wear, when slips occur, the strip 46 can be removed and ground thinner, or it can be replaced by another strip, so that the normal connection will still be secure.

In order to drive the conveying mechanism at two different speeds, I provide the change gearing best shown in Figs. 2, 3 and 4, where it will be seen that the outer end of the shaft 36 is journaled in a bearing in the gear casing 49, which also has journaled therein the hub 50 of the spur gear wheel 51, which is provided with the clutch tooth 52 projecting rearwardly therefrom. The hub 50 has an annular groove therein to receive the plates 53 extending thereinto and secured to the outer face of the gear casing 49 by screws, as shown, to prevent longitudinal movement of the wheel 51 on the shaft 54 on which it is journaled. This shaft 54 has the handle 55 on its outer end, by which it is pulled in and out through its bearing 56 formed in the side plate 16, and the shaft 54 has splined thereon the driving sprocket wheel 57, the teeth of which engage the rods 20 to drive the skeleton conveyor. The shaft 54 has pinned on it toward the center of the gear casing the clutch disk 58, which has the clutch pins 59 and 60 projecting therefrom rearwardly and forwardly, respectively, the pin 60 being adapted to engage the pin 52 on the gear 51, while the pin 59 is adapted to engage the clutch pin 61 projecting outwardly from the spur gear wheel 62, the hub of which is pinned on the outer end of the shaft 36, and which also furnishes a bearing for the inner end of the shaft 54. The clutch gear wheel 62 meshes with the smaller gear wheel 63, which is pinned on the countershaft 64 journaled in the lower end of the gear casing 49, and also having pinned thereon the larger spur gear wheel 65 meshing with the spur gear wheel 51.

As clearly shown in the drawings, the gear casing 49 is formed of a casting made of two halves secured together by screws 72, and it is supported from the side frame 16 by the diagonally extending bars 73 secured at their inner ends to the central portion of the gear casing, and by screws at their outer ends to the lugs 74 projecting inwardly from the side frame members 16.

With the foregoing construction, it will be apparent that when the handle 55 is in the neutral position shown in Fig. 3, the conveyor mechanism will be at rest, although the motor is rotating. When the handle 55 is shoved inwardly from the neutral position shown, the clutch teeth 59 and 61 are engaged, and the wheel 57 is driven directly at the same angular velocity as the shaft 36. When the handle 55 is pulled outward, the clutch pins 52 and 60 are engaged, and the shaft 54 and the wheel 57 are driven at a lower speed, since the reducing gearing formed by the different sizes of the wheels 51, 65, 63 and 62 comes into play. This mechanism is very useful, as it furnishes a means for starting and stopping the conveyor without interfering with the rotation of the motor, and also by changing the speed at which the conveyor moves, as it will be obvious that where the dishes are slightly soiled, they can be passed through the machine and sufficiently washed in less time than where they are badly soiled. It is also useful in that where large dishes and plates are being washed, they can be readily put on and taken off the conveyor while it is operating at the high speed, whereas smaller dishes and cups and glasses cannot be readily handled up to the full capacity of the conveyor unless it is moved at the slower speed.

It will be understood that the water being sprayed on the dishes upwardly from the lower spray members and downwardly from the top spray members carries the dirt off of the dishes and downward into the sink, from which the dirty water flows in the customary manner to the customary outlet. To prevent the larger particles of food that may be washed off from going through the outlet of the sink, and possibly eventually clogging the same, I provide the screening mechanism shown in Figs. 1, 2, 3 and 4, which preferably consists of the perforated sheet-metal plate 66, having the preferably upturned ends 67 and 68, and provided at its edges with the overhanging flanges 69, which co-operate with the outwardly projecting flanges 70 formed on the lower edges of the side members 15 and 16, which are preferably curved toward each other, as seen at 71, in order to accommodate the screen 66 in a narrower space. As shown in Figs. 1 and 2, the screen 66 necessarily extends from the receiving end well past the center of the conveyor, as it is in this portion that the food is washed off of the dishes and falls on the screen although it will be understood that I might extend the screen through the entire length of the conveyor, or even beyond it, if desired. The screen thus constructed can be readily slid off of the supporting side members 15 and 16, so that it can be cleaned.

While I have herein shown and described a novel slip clutch mechanism and a novel removable screen plate for washing machines, I do not herein claim the same, but reserve them for divisional applications.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In an apparatus of the class described, the combination with a framework, of a driven member mounted to move therein, a gear casing supported by and within the framework, a drive shaft journaled in the framework and having one end in the gear casing, a complementary shaft in axial alignment with the drive shaft and likewise journaled in the framework and having its adjacent end in the gear casing, a driving wheel engaging the driven member and splined on the second shaft so that the latter can be moved to and from the drive shaft without disengaging the driving wheel from the driven member, and speed reducing gearing connecting the two shafts and adjustable by moving the second shaft longitudinally to start or stop, or change the speed of the driven member.

2. In an apparatus of the class described, the combination with a framework, of a driven member mounted to move therein, a gear casing supported by and within the framework, a drive shaft journaled in the framework and having one end in the gear casing, a complementary shaft in axial alignment with the drive shaft and likewise journaled in the framework and having its adjacent end in the gear casing, a driving wheel engaging the driven member and splined on the second shaft so that the latter can be moved to and from the drive shaft without disengaging the driving wheel from the driven member, and speed reducing gearing connecting the two shafts and adjustable by moving the second shaft longitudinally to start or stop, or change the speed of the driven member, said speed reducing gearing consisting of a large spur gear wheel provided with a clutch tooth secured on the drive shaft, a smaller spur gear wheel provided with a clutch tooth mounted to rotate on the second shaft, a countershaft, a pair of large and smaller spur gear wheels secured on the countershaft and meshing with the previously mentioned smaller and larger spur gear wheels, respectively, and a clutch disk provided with a clutch tooth secured on the second shaft and adapted to engage the clutch teeth of either of the spur gear wheels provided with clutch teeth.

WALDEMAR L. LINDGREN.